US012805553B2

(12) United States Patent
Tamper et al.

(10) Patent No.: US 12,805,553 B2
(45) Date of Patent: Nov. 24, 2026

(54) HARDWOOD-DERIVED CARBOHYDRATE COMPOSITION

(71) Applicant: UPM-KYMMENE CORPORATION, Helsinki (FI)

(72) Inventors: Juha Tamper, Levanen (FI); Sami Turunen, Lappeenranta (FI); Mika Laitila, Hameenlinna (FI); Meri Ventola, Leipzig (DE); Jere Salminen, Lappeenranta (FI); Vilho Nissinen, Vehkataipale (FI)

(73) Assignee: UPM-Kymmene Corporation, Helsinki (FI)

( * ) Notice: Subject to any disclaimer, the term of this patent is extended or adjusted under 35 U.S.C. 154(b) by 786 days.

(21) Appl. No.: 18/009,391

(22) PCT Filed: Jun. 9, 2021

(86) PCT No.: PCT/FI2021/050429
§ 371 (c)(1),
(2) Date: Dec. 9, 2022

(87) PCT Pub. No.: WO2021/250324
PCT Pub. Date: Dec. 16, 2021

(65) Prior Publication Data

US 2023/0225383 A1 Jul. 20, 2023

(30) Foreign Application Priority Data

Jun. 12, 2020 (FI) ..................................... 20205616

(51) Int. Cl.
*A23L 29/30* (2016.01)
*A23K 10/30* (2016.01)
(Continued)

(52) U.S. Cl.
CPC ............. *A23L 29/30* (2016.08); *A23K 10/30* (2016.05); *A23K 20/163* (2016.05); *A23L 27/33* (2016.08)

(58) Field of Classification Search
CPC ... C08H 8/00; C13K 1/02; C13K 1/04; C13K 13/002; A23K 10/30; A23K 20/163;
(Continued)

(56) References Cited

U.S. PATENT DOCUMENTS 3,627,636 A 12/1971 Jaffe et al.
6,086,681 A 7/2000 Lindroos et al.
(Continued)

FOREIGN PATENT DOCUMENTS

CN 1180381 A 4/1998
CN 104560092 A 4/2015
(Continued)

OTHER PUBLICATIONS

Mackie, K.L. et al., Effect of sulphur dioxide and sulphuric acid on steam explosion of aspenwood, J. Wood Chem. Tech. 1985, vol. 5, No. 3, pp. 405-425.
(Continued)

*Primary Examiner* — Subbalakshmi Prakash
(74) *Attorney, Agent, or Firm* — Nixon Peabody LLP

(57) ABSTRACT

A hardwood-derived carbohydrate composition is disclosed. The hardwood-derived carbohydrate composition comprises monomeric sugars in an amount of 50-80 weight-% based on the total dry matter content of the carbohydrate composition, wherein the monomeric sugars include monomeric glucose and monomeric xylose, the amount of monomeric xylose in the carbohydrate composition being 40-60 weight-% based on the total dry matter content of the carbohydrate composition, and the weight ratio of monomeric glucose to mono-
(Continued)

meric xylose being 0.067-0.2. Disclosed is also a method for producing a wood-derived carbohydrate composition.

20 Claims, 1 Drawing Sheet

(51) Int. Cl.
*A23K 20/163* (2016.01)
*A23L 27/30* (2016.01)

(58) Field of Classification Search
CPC . A23L 29/30; A23L 27/33; C08L 1/02; Y02E 50/10
USPC .......................................................... 426/658
See application file for complete search history.

(56) References Cited

U.S. PATENT DOCUMENTS

| | | | |
|---|---|---|---|
| 2002/0153317 A1 | 10/2002 | Heikkila | |
| 2003/0094416 A1 | 5/2003 | Heikkila | |
| 2010/0263814 A1 | 10/2010 | Dottori et al. | |
| 2016/0152737 A1 | 6/2016 | Dottori et al. | |

FOREIGN PATENT DOCUMENTS

| | | | |
|---|---|---|---|
| EP | 1721988 | A2 | 11/2006 |
| EP | 2421911 | A1 | 2/2012 |
| EP | 2786988 | A1 | 8/2014 |
| FR | 2655346 | A1 | 6/1991 |
| WO | 199627028 | A1 | 9/1996 |
| WO | 2008137639 | A1 | 11/2008 |
| WO | 2013166469 | A1 | 11/2013 |
| WO | 2016124822 | A1 | 8/2016 |

OTHER PUBLICATIONS

Sassner, P. et al., Steam pretreatment of H2SO4-impregnated Salix for the production of bioethanol, Bioresource Technology, Jan. 12, 2007, vol. 99, No. 1, pp. 137-145.

Shuvashish, B. et al., Importance of chemical pretreatment for bioconversion of lignocellulosic biomass, Renewable and Sustainable Energy Reviews, vol. 36, Aug. 1, 2014, pp. 91-106.

Cara, C. et al., Production of fuel ethanol from steam-explosion pretreated olive tree pruning, Fuel, IPC Science and Technology Press, Guildford, GB, vol. 87, No. 6, Feb. 5, 2008, pp. 692-700.

Ohgren, K et al., Optimization of steam pretreatment of SO2-impregnated corn stover for fuel ethanol production, Applied Biochemistry and Biotechnology, Humana Press Inc., New York, vol. 124, No. 1-3, Mar. 1, 2005 pp. 1055-1067.

Search Report issued in Patent Application No. FI 20205616, mailed Jan. 26, 2021 (2 pp.).

Office Action issued in Patent Application No. FI 20205616, mailed Nov. 23, 2022 (5 pp.).

International Search Report in International Patent Application No. PCT/FI2021/050429, mailed Dec. 23, 2021 (9 pp.).

Liu, "Woody biomass: Niche position as a source of sustainable renewable chemicals and energy and kinetics of hot-water extraction/hydrolysis," Biotechnology Advances, vol. 28, pp. 563-582, (2010).

Office Action in French Patent Application No. FR2106161 with English Translation, dated Jul. 29, 2025, (12 pages).

Office Action with Search Report dated May 21, 2026 issued in Finnish Application No. 20253711 (8 pages).

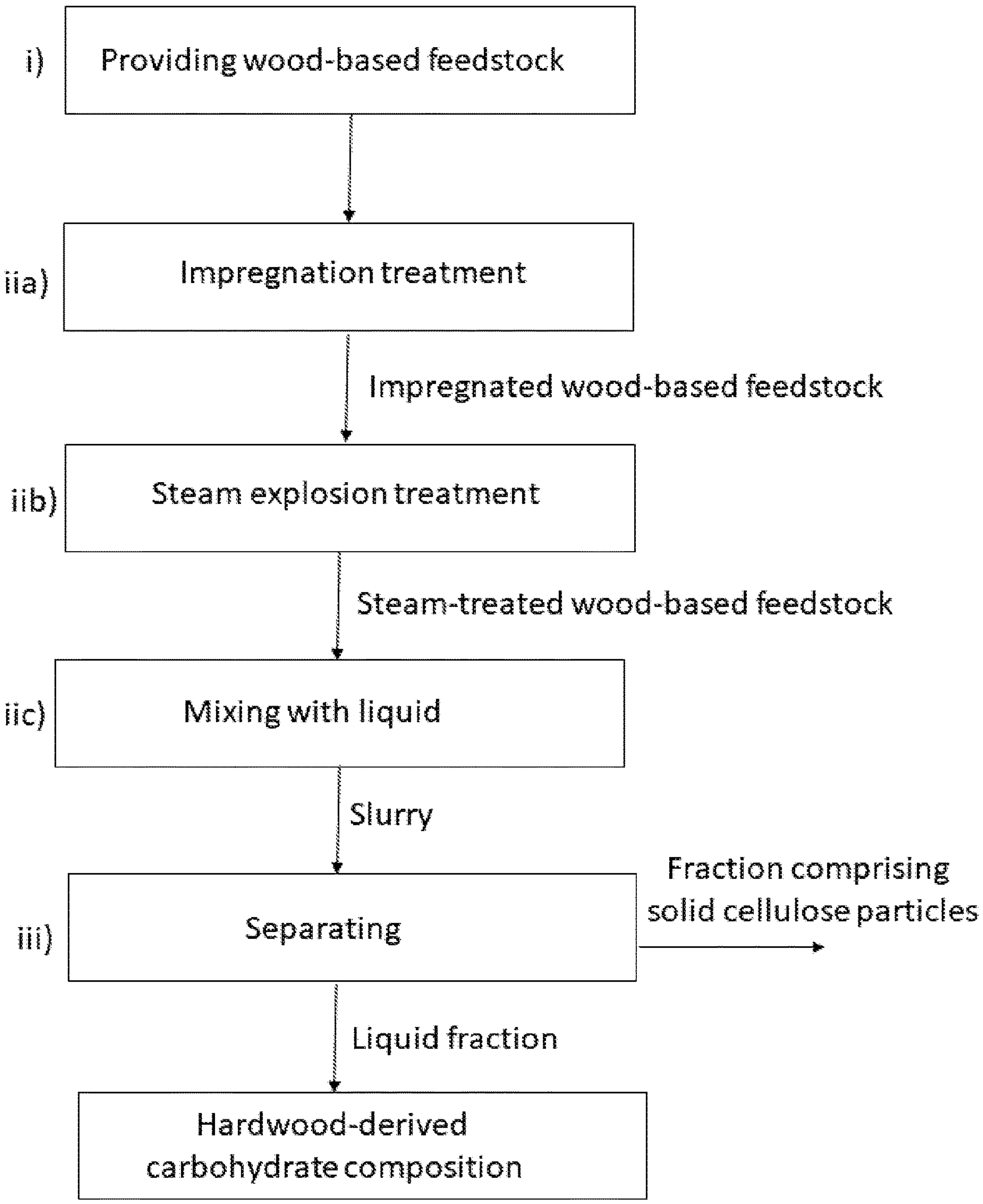
i)
Providing wood-based feedstock
iia)
Impregnation treatment
Impregnated wood-based feedstock
iib)
Steam explosion treatment
Steam-treated wood-based feedstock
iic)
Mixing with liquid
Slurry
iii)
Separating
Fraction comprising solid cellulose particles
Liquid fraction
Hardwood-derived carbohydrate composition

HARDWOOD-DERIVED CARBOHYDRATE COMPOSITION

CROSS-REFERENCE TO RELATED APPLICATIONS

This application is a U.S. National Phase Entry of International Application No. PCT/FI2021/050429, filed on Jun. 9, 2021, which claims the benefit of and priority to FI application No. 20205616, filed Jun. 12, 2020, each of which is hereby incorporated by reference herein in its entirety.

TECHNICAL FIELD

The present disclosure relates to a hardwood-derived carbohydrate composition comprising monomeric sugars. Further, the present disclosure relates to a method for producing a hardwood-derived carbohydrate composition. Further, the present disclosure relates to the use of the hardwood-derived carbohydrate composition.

BACKGROUND

Different methods are known for converting biobased raw material, such as lignocellulosic biomass, into a liquid stream of various sugars. Being able to provide sufficiently pure carbohydrate composition with properties suitable for further applications, such a production of mono-ethylene glycol or ethanol, has still remained as a task for researchers.

SUMMARY

A hardwood-derived carbohydrate composition is disclosed. The hardwood-derived carbohydrate composition may comprise monomeric sugars in an amount of 50-80 weight-% based on the total dry matter content of the carbohydrate composition. The monomeric sugars may include monomeric glucose and monomeric xylose, the amount of monomeric xylose in the carbohydrate composition may be 40-60 weight-% based on the total dry matter content of the carbohydrate composition, and the weight ratio of monomeric glucose to monomeric xylose may be 0.067-0.2.

A method for producing a hardwood-derived carbohydrate composition is also disclosed. The method may comprise:

i) providing a wood-based feedstock originating from wood-based raw material and comprising wood chips, wherein the wood chips are hardwood chips, ii) subjecting the wood-based feedstock to a pretreatment to form a slurry, wherein the pretreatment comprises:

iia) subjecting the wood-based feedstock to an impregnation treatment with an impregnation liquid comprising sulphuric acid;

iib) subjecting the impregnated wood-based feedstock to steam explosion treatment to form steam-treated wood-based feedstock, wherein the amount of sulphuric acid in the steam explosion treatment is 0.10-0.75 weight-% based on the total dry matter content of the wood-based feedstock;

iic) mixing the steam-treated wood-based feedstock from iib) with a liquid to form the slurry;

iii) separating the slurry into a liquid fraction and a fraction comprising solid cellulose particles by a solid-liquid separation process to recover the liquid fraction as the hardwood-derived carbohydrate composition.

Further is disclosed a hardwood-derived carbohydrate composition obtainable by the method as disclosed in the current specification.

Further is disclosed the use of the hardwood-derived carbohydrate composition as disclosed in the current specification for the production of a fermentation product, a sweetener, or animal feed.

BRIEF DESCRIPTION OF THE DRAWINGS

The accompanying drawing, which is included to provide a further understanding of the embodiments and constitute a part of this specification, illustrates an embodiment. In the drawing:

FIG. 1 presents a flow chart of one embodiment of the method for producing a hardwood-derived carbohydrate composition.

DETAILED DESCRIPTION

A hardwood-derived carbohydrate composition is disclosed. The hardwood-derived carbohydrate composition may comprise monomeric sugars in an amount of 50-80 weight-% based on the total dry matter content of the carbohydrate composition. The monomeric sugars may include monomeric glucose and monomeric xylose, the amount of monomeric xylose in the carbohydrate composition may be 40-60 weight-% based on the total dry matter content of the carbohydrate composition, and the weight ratio of monomeric glucose to monomeric xylose may be 0.067-0.2.

A method for producing a hardwood-derived carbohydrate composition is also disclosed. The method may comprise:

i) providing a wood-based feedstock originating from wood-based raw material and comprising wood chips, wherein the wood chips are hardwood chips, ii) subjecting the wood-based feedstock to a pretreatment to form a slurry, wherein the pretreatment comprises:

iia) subjecting the wood-based feedstock to an impregnation treatment with an impregnation liquid comprising sulphuric acid;

iib) subjecting the impregnated wood-based feedstock to steam explosion treatment to form steam-treated wood-based feedstock, wherein the amount of sulphuric acid in the steam explosion treatment is 0.10-0.75 weight-% based on the total dry matter content of the wood-based feedstock;

iic) mixing the steam-treated wood-based feedstock from iib) with a liquid to form the slurry;

iii) separating the slurry into a liquid fraction and a fraction comprising solid cellulose particles by a solid-liquid separation process to recover the liquid fraction as the hardwood-derived carbohydrate composition.

Further is disclosed a hardwood-derived carbohydrate composition obtainable by the method as disclosed in the current specification. In one embodiment, the hardwood-derived carbohydrate composition obtainable by the method as disclosed in the current specification is the hardwood-derived carbohydrate composition as disclosed in the current specification. I.e. the hardwood-derived carbohydrate composition disclosed in the current specification may be produced by the method as disclosed in the current specification.

Further is disclosed the use of the hardwood-derived carbohydrate composition as disclosed in the current specification for the production of a fermentation product, a sweetener, or animal feed. The fermentation product may be e.g. ethanol. The sweetener may be e.g. xylitol.

The hardwood-derived carbohydrate composition as disclosed in the current specification relates to a composition that comprises carbohydrates but may also in addition comprise additional components and/or elements e.g. as disclosed in the current specification. Thus, the "hardwood-derived carbohydrate composition" may be considered as a "hardwood-derived carbohydrate-containing composition" or a "hardwood-derived composition comprising carbohydrates".

In one embodiment, the weight ratio of monomeric glucose to monomeric xylose is 0.08-0.17, or 0.1-0.14. The inventors surprisingly found out that by the method as disclosed in the current specification, one is able to produce a hardwood-derived carbohydrate composition comprising a high content of monomeric C5 sugars and especially a high ratio of monomeric xylose compared to monomeric glucose. By the method as disclosed in the current specification, the C5 sugars may be efficiently recovered as a hardwood-derived carbohydrate composition.

The amount of monomeric sugars, i.e. monomeric C5 sugars and monomeric C6 sugars as well as the amount of oligomeric sugars, i.e. oligomeric C5 sugars and oligomeric C6 sugars, may be determined both qualitatively and quantitatively by high-performance liquid chromatography (HPLC) by comparing to standard samples. Examples of analysis methods can be found in e.g. Sluiter, A., et al., "Determination of sugars, byproducts, and degradation products in liquid fraction process samples", Technical Report, National Renewable Energy Laboratory, 2008, and Sluiter, A., et al., "Determination of Structural Carbohydrates and Lignin in Biomass", Technical Report, National Renewable Energy Laboratory, revised 2012.

As used herein, any weight-percentages are given as percent of the total dry matter content of the carbohydrate composition unless specified otherwise. Similarly, other fractions of weight (ppm etc.) may also denote a fraction of the total dry matter content of the carbohydrate composition unless specified otherwise.

The expression "total dry matter content" may refer to the total amount of solids including suspended solids and soluble or dissolved solids. The total dry matter content may be determined after removing the liquid from a sample followed by drying at a temperature of 45° C. for 24 hours. The effectiveness of the liquid removal may be assured by weighing the sample, drying for a further two hours at the specified temperature, and reweighing the sample. If the measured weights are essentially the same, the drying has been complete, and the total weight may be recorded.

By the expression "C5 sugars" should be understood in this specification, unless otherwise stated, as referring to xylose, arabinose, or any mixture or combination thereof. By the expression "C6 sugars" should be understood in this specification, unless otherwise stated, as referring to glucose, galactose, mannose, fructose, or any mixture or combination thereof. By the expression that the sugar is "monomeric" should be understood in this specification, unless otherwise stated, as referring to a sugar molecule present as a monomer, i.e. not coupled or connected to any other sugar molecule(s).

In the current specification the amounts of different components/elements in the hardwood-derived carbohydrate composition are presented in weight-% based on the total dry matter content of the carbohydrate composition. In this specification the term "total dry matter content of the carbohydrate composition" may refer to the weight of the carbohydrate composition as determined after removing any solid particles or material from the carbohydrate composition e.g. by filtering and removing the liquid from the filtrate or pressate followed by drying the at a temperature of 45° C. for 24 hours. The effectiveness of the drying may be assured by weighing the sample, drying for a further two hours at the specified temperature, and reweighing the sample. If the measured weights are the same, the drying has been complete, and the total weight may be recorded.

As is clear to the skilled person, the total amount of the different components/elements in the hardwood-derived carbohydrate composition may not exceed 100 weight-%. The amount in weight-% of the different components/elements in the hardwood-derived carbohydrate composition may vary within the given ranges.

In one embodiment, the hardwood-derived carbohydrate composition comprises monomeric sugars in an amount of 60-80 weight-% based on the total dry matter content of the carbohydrate composition.

In one embodiment, the carbohydrate composition comprises monomeric C6 sugars in an amount of at most 15 weight-%, or at most 13 weight-%, or at most 11 weight-%, based on the total dry matter content of the carbohydrate composition.

The monomeric C5 sugars may be xylose and/or arabinose. The monomeric C6 sugars may be glucose, galactose, mannose, and/or fructose.

In one embodiment, the amount of monomeric xylose in the carbohydrate composition is 45-55 weight-% based on the total dry matter content of the carbohydrate composition.

In one embodiment, in the carbohydrate composition, at least 90% or at least 95% of the xylose is in monomeric form.

In one embodiment, the carbohydrate composition comprises monomeric sugars and oligomeric sugars in a total amount of 65-85 weight-% based on the total dry matter content of the carbohydrate composition. In one embodiment, the carbohydrate composition comprises oligomeric sugars in an amount of 1-15 weight-%, or 2-10 weight-% based on the total dry matter content of the carbohydrate composition.

By the expression that the sugar is "oligomeric" should be understood in this specification, unless otherwise stated, as referring to a sugar molecule consisting of two or more monomers coupled or connected to each other.

The oligomeric C5 sugars may be xylose and/or arabinose. The oligomeric C6 sugars may be glucose, galactose, mannose, and/or fructose.

In one embodiment, the composition comprises one or more of monomeric arabinose, monomeric galactose, monomeric mannose, and monomeric fructose in an amount of 0.5-5 weight-%, or 1-4 weight-% each, based on the total dry matter content of the carbohydrate composition.

The efficiency of the washing that may be carried out in step iii) may be evaluated by analyzing the liquid fraction to determine its composition quantitatively and/or qualitatively. The analysis may be used to determine e.g. the amounts and types of impurities present in the liquid fraction as well as the absolute and relative amounts of C5 sugars and C6 sugars. Non-limiting examples of such a method for determining the presence of various impurities include, but are not limited to, conductivity, optical purity (e.g. color, or turbidity), density of the liquid fraction.

In one embodiment, the conductivity of a 10% aqueous solution of the carbohydrate composition is –2.8-3.5 mS/cm, when determined according to SFS-EN 27888 (1994). The value of the conductivity may be used to determine the efficiency of the washing taking place in step iii). I.e. the value of conductivity may be used to determine the amount of soluble lignin present.

The carbohydrate composition may comprise organic impurities (including soluble lignin) in an amount of at most 30 weight-%, or at most 28 weight-%, or at most 26 weight-%, or at most 24 weight-%, or at most 22 weight-%, based on the total dry matter content of the carbohydrate composition. The carbohydrate composition may comprise organic impurities (including soluble lignin) in an amount of 6-30 weight-%, or 8-28 weight-%, or 10-26 weight-%, or 12-24 weight-%, based on the total dry matter content of the carbohydrate composition. The carbohydrate composition may comprise organic impurities in an amount of 6-30 weight-%, or 8-28 weight-%, or 10-26 weight-%, or 12-24 weight-%, based on the total dry matter content of the carbohydrate composition. The carbohydrate composition may comprise inorganic impurities in an amount of 0-6 weight-%, or 0.1-3 weight-%, or 0.2-2 weight-%, or 0.3-1 weight-%, based on the total dry matter content of the carbohydrate composition.

Organic acids can be mentioned as examples of organic impurities. Non-limiting examples of organic impurities are oxalic acid, citric acid, succinic acid, formic acid, acetic acid, levulinic acid, 2-furoic acid, 5-hydroxymethylfurfural (5-HMF), furfural, glycolaldehyde, glyceraldehyde, as well as various acetates, formiates, and other salts or esters. The quality and quantity of organic impurities in the carbohydrate composition may be determined using e.g. a HPLC coupled with e.g. a suitable detector, infrared (IR) spectroscopy, ultraviolet-visible (UV-VIS) spectroscopy, or nuclear magnetic resonance (NMR) spectrometry. Examples of organic impurities that may be present in the carbohydrate composition are listed in below table 1.

TABLE 1

Organic impurities and their amounts

| Impurity | Level at most (weight-% of total dry matter content of carbohydrate composition) |
|---|---|
| Oxalic acid | 1 |
| Citric acid | 3 |
| Succinic acid | 10 |
| Formic acid | 2 |
| Acetic acid | 8 |
| Levulinic acid | 2 |
| Total carboxylic acids | 26 |
| 2-Furoic acid | 1 |
| 5-Hydroxymethyl furfural | 2 |
| Furfural | 1 |
| Total furans | 2 |
| Glucuronic acid | 1 |
| Galacturonic acid | 5 |

The carbohydrate composition may comprise inorganic impurities. The inorganic impurities may be e.g. a soluble inorganic compound in the form of various salts. The inorganic impurities may be salts of the group of elements consisting of Al, As, B, Ca, Cd, Cl, Co, Cr, Cu, Fe, K, Mg, Mn, Mo, Na, Ni, P, Pb, S, Se, Si, and Zn. The amounts of inorganic impurities in the carbohydrate composition can be analyzed using inductively coupled plasma-optical emission spectroscopy (ICP-OES) according to standard SFS-EN ISO 11885:2009. Examples of organic impurities that may be present in the carbohydrate composition are listed in below table 2.

TABLE 2

Inorganic impurities and their amounts

| Element | Level at most (ppm or mg/kg of total dry matter content of composition) |
|---|---|
| Aluminium, Al | 50 |
| Arsenic, As | 50 |
| Boron, B | 50 |
| Calcium, Ca | 1000 |
| Cadmium, Cd | 50 |
| Chloride, Cl | 1000 |
| Cobalt, Co | 50 |
| Chromium, Cr | 50 |
| Copper, Cu | 50 |
| Iron, Fe | 200 |
| Potassium, K | 1000 |
| Magnesium, Mg | 500 |
| Manganese, Mn | 200 |
| Molybdenum, Mo | 50 |
| Sodium, Na | 500 |
| Nickel, Ni | 50 |
| Phosphorus, P | 750 |
| Lead, Pb | 50 |
| Sulphur, S | 4000 |
| Selenium, Se | 50 |
| Silicon, Si | 50 |
| Zinc, Zn | 50 |

In one embodiment, the carbohydrate composition comprises carboxylic acids in an amount of 5-20 weight-%, or 5.5-18 weight-%, or 6-16 weight-%, based on the total dry matter content of the carbohydrate composition.

In one embodiment, the carbohydrate composition comprises 5-hydroxymethylfurfural (5-HMF) in an amount of at most 2 weight-%, or at most 1.5 weight-%, or at most 1.0 weight-%, based on the total dry matter content of the carbohydrate composition In one embodiment, the carbohydrate composition comprises sulphur in an amount of 250-4000 mg/kg, or 500-3500 mg/kg, or 1000-3000 mg/kg, or 1500-2500 mg/kg, based on the total dry matter content of the carbohydrate composition. The amount of sulphur may be determined according to standard SFS-EN ISO 11885 (2009).

The carbohydrate composition may comprise nitrogen in an amount of at most 0.3 weight-%, or at most 0.2 weight-%, or at most 0.1 weight-%, based on the total dry matter content of the carbohydrate composition when measured as total nitrogen content of the carbohydrate composition. The total amount of nitrogen present in the carbohydrate composition may be determined using any suitable method known to a person skilled in the art, e.g. the Kjeldahl method or catalytic thermal decomposition/chemiluminescence methods.

The carbohydrate composition may comprise soluble lignin in an amount of 5-15 weight-%, or 5.5-14 weight-%, or 6-12 weight-%, based on the total dry matter content of the carbohydrate composition. The presence of soluble lignin in the carbohydrate composition may evidence that the carbohydrate composition is derived from wood.

The amount of soluble lignin may be determined by UV-VIS absorption spectroscopy in the following manner: The amount of soluble lignin present in the carbohydrate composition is determined by diluting a sample of carbohydrate composition so that its absorbance at 205 nm is 0.2-0.7 AU when compared to a reference sample of pure water and using a cuvette with a path length of 1 cm. The soluble lignin content of the sample in mg/l may then be calculated using the following equation $$x = \left(\frac{A}{a}\right) \times D$$

where A is absorbance of the sample, a is the absorptivity coefficient 0.110 l/mgcm, and D is a dilution factor.

The total dry matter content of the wood-derived carbohydrate composition may be 5-15 weight-%, or 6-14 weight-%, or 7-13 weight-% when determined after drying at a temperature of 45° C. for 24 hours.

The method for producing the hardwood-derived carbohydrate composition may comprise subjecting a wood-based feedstock to pretreatment. By the expression "pretreating" or "pretreatment" should be understood in this specification, unless otherwise stated, (a) process(es) conducted to convert wood-based feedstock to a slurry which may be separated into a liquid fraction and a fraction comprising solid cellulose particles. I.e. the liquid fraction may be separated from the fraction comprising solid cellulose particles. The fraction comprising solid cellulose particles may further include an amount of lignocellulose particles as well as lignin particles in free form. Lignocellulose comprises lignin chemically bonded to the cellulose particles.

The wood-based raw material may e.g. originate from beech, birch, ash, oak, maple, chestnut, willow, or poplar. The wood-based raw material may also be any combination or mixture of these.

In general, wood and wood-based raw materials are essentially composed of cellulose, hemicellulose, lignin, and extractives. Cellulose is a polysaccharide consisting of a chain of glucose units. Hemicellulose comprises polysaccharides, such as xylan, mannan, and glucan.

Providing the wood-based feedstock in step i) may comprise subjecting wood-based raw material to a mechanical treatment selected from debarking, chipping, dividing, cutting, beating, grinding, crushing, splitting, screening, and/or washing the wood-based raw material to form the wood-based feedstock.

Thus, providing the wood-based feedstock originating from the wood-based raw material may comprise subjecting the wood-based raw material to a mechanical treatment to form a wood-based feedstock. The mechanical treatment may comprise debarking, chipping, dividing, cutting, beating, grinding, crushing, splitting, screening, and/or washing the wood-based raw material. During the mechanical treatment e.g. wood logs can be debarked and/or wood chips of the specified size and structure can be formed. The formed wood chips can also be washed, e.g. with water, in order to remove e.g. sand, grit, and stone material therefrom. Further, the structure of the wood chips may be loosened before the pretreatment step. The wood-based feedstock may contain a certain amount of bark from the wood logs.

Providing the wood-based feedstock may comprise purchasing the wood-based feedstock. The purchased wood-based feedstock may comprise purchased wood chips or sawdust that originate from wood-based raw material.

Pretreatment in step ii) of the wood-based feedstock may comprise one or more different pretreatment steps. During the different pretreatment steps the wood-based feedstock as such changes. The aim of the pretreatment step(s) is to form a slurry for further processing.

The pretreatment ii) may comprise subjecting the wood-based feedstock to pre-steaming. The pretreatment ii) may comprise subjecting the wood-based feedstock received from the mechanical treatment to pre-steaming. Pretreatment in ii) may comprise, before subjecting to the impregnation treatment, subjecting the wood-based feedstock to pre-steaming to form pre-steamed wood-based feedstock. The pretreatment in ii) may comprise, an impregnation treatment and a steam explosion treatment and comprise, before subjecting the wood-based feedstock to impregnation treatment and thereafter to steam explosion treatment, subjecting the wood-based feedstock to pre-steaming.

In one embodiment, pretreatment in ii) comprises, before subjecting to the impregnation treatment, subjecting the wood-based feedstock to pre-steaming to form pre-steamed wood-based feedstock. The pre-steaming of the wood-based feedstock may be carried out with steam having a temperature of 100-130° C. at atmospheric pressure. During the pre-steaming the wood-based feedstock is treated with steam of low pressure. The pre-steaming may be also carried out with steam having a temperature of below 100° C., or below 98° C., or below 95° C. The pre-steaming has the added utility of reducing or removing air from inside of the wood-based feedstock. The pre-steaming may take place in at least one pre-steaming reactor.

The pretreatment in ii) comprises step iia) of subjecting the wood-based feedstock to an impregnation treatment with an impregnation liquid comprising sulphuric acid. The impregnation liquid may consist of sulphuric acid and water. The impregnation liquid may comprise sulphuric acid in an amount of at most 20 weight-% based on the total weight of the impregnation liquid. Subjecting the wood-based feedstock to the impregnation treatment may form an impregnated wood-based feedstock comprising sulphuric acid in an amount of at least 0.5 weight-% based on the total dry matter content of the wood-based feedstock.

The impregnation treatment may be carried out to the wood-based feedstock received from the mechanical treatment and/or from the pre-steaming. The wood-based feedstock may be transferred from the mechanical treatment and/or from the pre-steaming to the impregnation treatment with a feeder. The feeder may be a screw feeder, such as a plug screw feeder. The feeder may compress the wood-based feedstock during the transfer. When the wood-based feedstock is then entering the impregnation treatment, it may become expanded and absorbs the impregnation liquid.

The sulphuric acid may be dilute sulphuric acid. The total amount of acid added to the wood-based feedstock may be 0.3-5.0% w/w, 0.5-3.0% w/w, 0.6-2.5% w/w, 0.7-1.9% w/w, or 1.0-1.6% w/w based on the total dry matter content of the wood-based feedstock. The impregnation liquid may act as a catalyst in affecting the hydrolysis of the hemicellulose in the wood-based feedstock. In one embodiment, the sulphuric acid catalyzes the hydrolysis of the hemicellulose in the wood-based feedstock to monomeric sugars.

The impregnation treatment may be conducted in at least one impregnation reactor or vessel. In one embodiment, two or more impregnation reactors are used. The transfer from one impregnation reactor to another impregnation reactor may be carried out with a screw feeder.

The impregnation treatment may be carried out by conveying the wood-based feedstock through at least one impregnation reactor that is at least partly filled with the impregnation liquid, i.e. the wood-based feedstock may be transferred into the impregnation reactor, where it sinks into the impregnation liquid, and transferred out of the impregnation reactor such that the wood-based feedstock is homogenously impregnated with the impregnation liquid. As a result of the impregnation treatment, impregnated wood-based feedstock is formed. The impregnation treatment may be carried out as a batch process or in a continuous manner.

The residence time of the wood-based feedstock in an impregnation reactor, i.e. the time during which the wood-based feedstock is in contact with the impregnation liquid, may be 1-30 minutes. The temperature of the impregnation liquid may be e.g. 20-99° C., or 40-95° C., or 60-93° C. Keeping the temperature of the impregnation liquid below 100° C. has the added utility of hindering or reducing hemicellulose from dissolving. In one embodiment, the impregnation treatment is carried out at a temperature of 80-100° C., or 90-99° C., for 1-30 minutes.

After the impregnation treatment, the impregnated wood-based feedstock may be allowed to stay in e.g. a storage tank or a silo for a predetermined period of time to allow the impregnation liquid absorbed into the wood-based feedstock to stabilize. This predetermined period of time may be 15-60 minutes, or e.g. about 30 minutes.

In one embodiment, the wood-based feedstock is subjected to an impregnation treatment with dilute sulphuric acid having a concentration of 1.32% w/w and a temperature of 92° C.

Pretreatment ii) may comprise subjecting the wood-based feedstock to steam explosion treatment. The wood-based feedstock from the impregnation treatment may be subjected to steam explosion treatment. I.e. pretreatment in ii) may comprise subjecting the impregnated wood-based feedstock to steam explosion treatment to form a steam-treated wood-based feedstock.

In one embodiment, the pretreatment in ii) comprises mechanical treatment of wood-based material to form a wood-based feedstock, the pre-steaming of the wood-based feedstock to form pre-steamed feedstock, impregnation treatment of the pre-steamed wood-based feedstock to form impregnated wood-based feedstock, and the steam explosion treatment of the impregnated wood-based feedstock. In one embodiment, the pretreatment in ii) comprises pre-steaming the wood-based feedstock, impregnation treatment of the pre-steamed wood-based feedstock, and steam explosion treatment of the impregnated wood-based feedstock. In one embodiment, the pretreatment in ii) comprises impregnation treatment of the wood-based feedstock, and steam explosion treatment of the impregnated wood-based feedstock. I.e. the wood-based feedstock having been subjected to the impregnation treatment may thereafter be subjected to the steam explosion treatment. Also, the wood-based feedstock having been subjected to pre-steaming, may then be subjected to the impregnation treatment and thereafter the impregnated wood-based feedstock having been subjected to the impregnation treatment may be subjected to steam explosion treatment.

The wood-based feedstock can be stored in e.g. chip bins or silos between the different treatments. Alternatively, the wood-based feedstock may be conveyed from one treatment to the other in a continuous manner.

The pretreatment in ii) comprises step iib) of subjecting the impregnated wood-based feedstock to steam explosion treatment to form steam-treated wood-based feedstock. The amount of sulphuric acid in the steam explosion treatment may be 0.10-0.75 weight-% based on the total dry matter content of the wood-based feedstock. The steam explosion treatment in iib) may be carried out by treating the impregnated wood-based feedstock with steam having a temperature of 130-240° C., or 180-200° C., or 185-195° C. under a pressure of 0.17-3.25 MPaG followed by a sudden, explosive decompression of the feedstock. The feedstock may be treated with the steam for 1-20 minutes, or 1-20 minutes, or 2-15 minutes, or 4-13 minutes, or 3-10 minutes, or 3-8 minutes, before the sudden, explosive decompression of the steam-treated wood-based feedstock.

In this specification, the term "steam explosion treatment" may refer to a process of hemihydrolysis in which the feedstock is treated in a reactor (steam explosion reactor) with steam having a temperature of 130-240° C., or 180-200° C., or 185-195° C. under a pressure of 0.17-3.25 MPaG followed by a sudden, explosive decompression of the feedstock that results in the rupture of the fiber structure of the feedstock.

In one embodiment, the amount of sulphuric acid in the steam explosion treatment may be 0.10-0.75 weight-% based on the total dry matter content of the wood-based feedstock. The amount of acid present in the steam explosion treatment may be determined by measuring the sulphur content of the liquid of the steam-treated wood-based feedstock or the liquid part of the steam-treated wood-based feedstock after steam explosion treatment. The amount of sulphuric acid in the steam explosion reactor may be determined by subtracting the amount of sulphur in the wood-based feedstock from the measured amount of total sulphur in the steam-treated wood-based feedstock.

The steam explosion treatment may be conducted in a pressurized reactor. The steam explosion treatment may be carried out in the pressurized reactor by treating the impregnated wood-based feedstock with steam having a temperature of 130-240° C., or 180-200° C., or 185-195° C. under a pressure of 0.17-3.25 MPaG followed by a sudden, explosive decompression of the—feedstock. The impregnated wood-based feedstock may be introduced into the pressurized reactor with a compressing conveyor, e.g. a screw feeder. During transportation with the screw feeder, if used, the acid in liquid form is removed, and a part of the impregnation liquid absorbed by the feedstock is removed as a pressate while most of it remains in the feedstock. The impregnated wood-based feedstock may be introduced into the pressurized reactor along with steam and/or gas. The pressure of the pressurized reactor can be controlled by the addition of steam. The pressurized reactor may operate in a continuous manner or as a batch process. The impregnated wood-based feedstock, e.g. the wood-based feedstock that has been subjected to an impregnation treatment, may be introduced into the pressurized reactor at a temperature of 25-140° C. The residence time of the feedstock in the pressurized reactor may be 0.5-120 minutes. The term "residence time" should in this specification, unless otherwise stated, be understood as the time between the feedstock being introduced into or entering e.g. the pressurized reactor and the feedstock being exited or discharged from the same.

As a result of the hemihydrolysis of the wood-based feedstock affected by the steam explosion treatment in the reactor, the hemicellulose present in the wood-based feedstock may become hydrolyzed or degraded into e.g. xylose oligomers and/or monomers. The hemicellulose comprises polysaccharides such as xylan, mannan and glucan. Xylan is thus hydrolyzed into xylose that is a monosaccharide. In one embodiment, 87-95%, or 89-93%, or 90-92%, of xylan present the impregnated wood-based feedstock is converted into xylose in iib).

Thus, steam explosion of the feedstock may result in the formation of an output stream. The output stream from the steam explosion may be subjected to steam separation. The output stream from the steam explosion may be mixed or combined with a liquid, e.g. water. The output stream of the steam explosion may be mixed with a liquid to form a slurry. The liquid may be pure water or water containing C5 sugars. The water containing C5 sugars may be recycled water from separation and/or washing the fraction comprising solid cellulose particles before enzymatic hydrolysis. The output stream may be mixed with the liquid and the resulting mass may be homogenized mechanically to break up agglomerates. Pretreatment in ii) may comprise mixing the steam-treated wood-based feedstock with a liquid. In one embodiment, the method comprises step iic) of mixing the steam-treated wood-based feedstock from iib) with a liquid to form the slurry.

Thus, as a result of the pretreatment ii) a slurry may thus be formed. The slurry may comprise a liquid phase and a solid phase. The slurry may comprise solid cellulose particles. In step iii) the slurry may be separated into a liquid fraction and a fraction comprising solid cellulose particles.

The method comprises iii) of separating a liquid fraction and a fraction comprising solid cellulose particles by a solid-liquid separation process to recover the liquid fraction as the hardwood-derived carbohydrate composition. In one embodiment, the solid-liquid separation process in iii) comprises washing. In one embodiment, the washing in iii) is continued until the amount of soluble organic components in the fraction comprising solid cellulose particles is 0.5-5 weight-%, or 1-4 weight-%, or 1.5-3 weight-% based on the total dry matter content.

In one embodiment, separating the liquid fraction and the fraction comprising solid cellulose particles in iii) is carried out by displacement washing or countercurrent washing. Thus, the solid-liquid separation process may be selected from displacement washing and countercurrent washing.

Displacement washing, or replacement washing as it may also be called, is a method for separating solids and liquid from each other by the use of a rather minor amount of washing liquid. Thus, displacement washing may be considered as an operation by which it is possible to wash solid particles with a minimum amount of washing liquid, such as water.

In countercurrent washing, the movement of the fraction comprising solid cellulose particles in generally in a forward direction, whereas the washing liquid, such as water, flows in the opposite direction. As for the displacement washing, also the countercurrent washing may reduce the consumption of washing liquid to a great extent.

In one embodiment, countercurrent washing comprises at least two solid-liquid separation steps and one dilution in between the steps with washing solution. The washing solution may be clean water. The amount of water needed may vary depending on how many solid-liquid separation steps are performed in total, the total dry matter content in the feed of the solid-liquid separation step and the total dry matter content in the fraction comprising solid cellulose particles after each solid-liquid separation step.

The washing liquid may be fresh washing water or recycled washing water. The washing water may be fresh water, drinking water, or a sugar containing liquid with low sugar content. The conductivity of the washing liquid may be about 0.1 mS/cm.

The ratio of the used washing liquid to the solids in step iii) may be 0.5:1-8:1 (w/w), or 0.5:1-5:1 (w/w), or 0.5:1-3:1 (w/w), or 0.5:1-2:1 (w/w) in the case of displacement washing.

The ratio of the used washing liquid to the solids in step iii) may be 0.5:1-8:1 (w/w), or 0.5:1-5:1 (w/w) in the case of countercurrent washing.

The progression of the displacement washing as well as of the countercurrent washing may be monitored by measuring the conductivity of the liquid fraction recovered from this treatment. Once the conductivity of the liquid fraction is below or equal to a predetermined threshold value of 0.35 mS/cm, one may conclude that that the desired amount of the C5 sugars and other soluble impurities have been removed from the fraction comprising solid cellulose particles and the washing may be concluded. In one embodiment, the washing is continued until the conductivity of the liquid fraction is 0.1-1.0 mS/cm or 0.2-0.5 mS/cm.

Alternatively, the separation in step iii) may be carried out by filtration, decanting, and/or by centrifugal treatment. The filtration may be vacuum filtration, filtration based on the use of reduced pressure, filtration based on the use of overpressure, or filter pressing. The decanting may be repeated in order to improve separation.

The method as disclosed in the current specification has the added utility of providing a wood-derived carbohydrate composition with a high content of monomeric sugars, and especially monomeric xylose. The wood-derived carbohydrate composition has the added utility of fulfilling purity properties required for further use in e.g. a process of catalytic conversion for the production of e.g. mono-ethylene glycol.

EXAMPLES

Reference will now be made in detail to the embodiments of the present disclosure, an example of which is illustrated in the accompanying drawing.

The description below discloses some embodiments in such a detail that a person skilled in the art is able to utilize the method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

The enclosed FIG. 1 illustrates an embodiment of a flow chart of the method for producing a hardwood-derived carbohydrate composition in some detail. The method of FIG. 1 for producing a hardwood-derived carbohydrate composition comprises providing a wood-based feedstock originating from wood-based raw material and comprising wood chips, wherein the wood chips are hardwood chips (step i) of FIG. 1). The provided wood-based feedstock is then subjected to pretreatment to form a slurry (step ii) of FIG. 1). The pretreatment comprises: iia) of subjecting the wood-based feedstock to an impregnation treatment with an impregnation liquid of sulphuric acid to form an impregnated wood-based feedstock. After the impregnation treatment the impregnated wood-based feedstock is subjected to steam explosion treatment to form steam-treated wood-based feedstock (step iib) of FIG. 1). In step iic) the steam-treated wood-based feedstock from iib) is mixed with a liquid to form the slurry. Then in step iii) the slurry is separated into a liquid fraction and a fraction comprising solid cellulose particles by a solid-liquid separation process to recover the liquid fraction as the hardwood-derived carbohydrate composition.

Example 1—Producing Hardwood-Derived Carbohydrate Composition

In this example a hardwood-derived carbohydrate composition was prepared.

First a wood-based feedstock comprising chips of beech wood was provided. The wood-based feedstock was then subjected to pretreatment in the following manner:

The wood-based feedstock was subjected to pre-steaming. Pre-steaming of the wood-based feedstock was carried out at atmospheric pressure with steam having a temperature of 100° C. for 180 minutes. The pre-steamed feedstock was then subjected to an impregnation treatment with dilute sulphuric acid having a concentration of 1.32% w/w and a temperature of 92° C. The pre-steamed wood-based feedstock was allowed to be affected by the impregnation liquid for 30 minutes. The acid-impregnated wood-based feedstock was then subjected to steam explosion treatment. The steam explosion treatment was carried out by treating the impregnated wood-based feedstock with steam having a temperature of 191° C. at atmospheric pressure followed by a sudden, explosive decompression of the wood-based feedstock. The amount of sulphuric acid in steam explosion reactor was 0.33 weight-% based on the total dry matter content of the wood-based feedstock. In the determination of the amount of sulphuric acid the sulphur content of wood was 0.02 weight-% based on the total dry matter content of the wood used.

In the pretreatment, the conversion of xylan in the wood-based feedstock into xylose was 91% and the ratio of solubilized glucose to solubilized xylose was 0.14 as determined by HPLC-RI as detailed below. The steam-treated wood-based feedstock was then mixed with water in a mixing vessel.

As a result of the above pretreatment steps, a slurry was formed. The slurry comprised a liquid fraction and a fraction comprising solid cellulose particles. The slurry was then separated into a liquid fraction and a fraction comprising solid cellulose particles by a solid-liquid separation process, which in this example was countercurrent washing. The countercurrent washing was continued until the amount of soluble components in the fraction comprising solid cellulose particles was 2.0 weight-% based on the total dry matter content. The dry solids content of the fraction comprising solid cellulose particles was 32 weight-% after the washing.

The hardwood-derived carbohydrate composition recovered was analyzed by HPLC-RI using a Waters e2695 Alliance Separation module, a Waters 2998 Photodiode Array, and a Waters 2414 Refractive Index detector. Separation was achieved with a Bio-Rad Aminex HPX-87 column with dimensions 300 mm×7.8 mm equipped with Micro-Guard Deashing and Carbo-P guard columns in series. Ultrapure water was used as eluent. The results are presented in the below table:

| | Weight-% based on the total dry matter content |
|---|---|
| Monomeric sugars | |
| Glucose, HPLC-RI | 7.0 weight-% |
| Xylose, HPLC-RI | 51.5 weight-% |
| Galactose, HPLC-RI | 1.6 weight-% |
| Arabinose, HPLC-RI | 2.0 weight-% |
| Mannose, HPLC-RI | 1.3 weight-% |
| Fructose, HPLC-RI | 0.1 weight-% |
| Oligomeric sugars | |
| Glucose, acid hydrolysis, HPLC-RI | 0.0 weight-% |
| Xylose, acid hydrolysis, HPLC-RI | 0.0 weight-% |
| Galactose, acid hydrolysis, HPLC-RI | 1.8 weight-% |
| Arabinose, acid hydrolysis, HPLC-RI | 0.0 weight-% |
| Mannose, acid hydrolysis, HPLC-RI | 0.0 weight-% |
| Fructose, acid hydrolysis, HPLC-RI | 0.0 weight-% |
| Olig. carbohydrates total, acid hydrolysis, HPLC-RI | 1.8 weight-% |
| Ash 525° C. | 0.2 weight-% |

-continued

| | Weight-% based on the total dry matter content |
|---|---|
| Lignin, soluble, UV 205 | 6.5 weight-% |
| Total nitrogen | 0.1 weight-% |
| Carboxylic acids, total, HPLC-PDA | 7.2 weight-% |
| 5-HMF | 0.2 weight-% |
| Sulphur, S, ICP | 0.2 weight-% |

The amount of oligomeric sugars in the sample was determined by hydrolyzing the oligomeric sugars into monomeric sugars using acid hydrolysis, analyzing the acid hydrolyzed sample using HPLC-RI, and comparing the result to those for samples for which the hydrolysis was not performed. By subtracting the amount of monomeric sugars in the untreated sample, the amount of oligomeric sugars was calculated.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined together to form a further embodiment. A hardwood-derived carbohydrate composition or a method disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A hardwood-derived carbohydrate composition produced by a process comprising:

impregnating a hardwood feedstock with sulphuric acid and subjecting the impregnated hardwood feedstock to steam explosion treatment, the hardwood-derived carbohydrate composition including monomeric glucose and monomeric xylose, the amount of monomeric xylose in the carbohydrate composition being 40-60 weight-% based on the total dry matter content of the carbohydrate composition, wherein the weight ratio of monomeric glucose to monomeric xylose is 0.1-0.2, and wherein the carbohydrate composition comprises soluble lignin in an amount of 5-15 weight % based on the total dry matter content of the carbohydrate composition.

2. The hardwood-derived carbohydrate composition of claim 1, wherein the amount of monomeric xylose in the carbohydrate composition being 45-55 weight-% based on the total dry matter content of the carbohydrate composition.

3. The hardwood-derived carbohydrate composition of claim 1, wherein the carbohydrate composition comprises monomeric sugars and oligomeric sugars in a total amount of 65-85 weight-% based on the total dry matter content of the carbohydrate composition.

4. The hardwood-derived carbohydrate composition of claim 1, wherein the carbohydrate composition comprises carboxylic acids in an amount of 5-20 weight-%, based on the total dry matter content of the carbohydrate composition.

5. The hardwood-derived carbohydrate composition of claim 1, wherein the carbohydrate composition comprises 5-hydroxymethylfurfural (5-HMF) in an amount of at most 2 weight-%, based on the total dry matter content of the carbohydrate composition.

6. The hardwood-derived carbohydrate composition of claim 1, wherein the carbohydrate composition comprises sulphur in an amount of 250-4000 mg/kg, based on the total dry matter content of the carbohydrate composition.

7. The hardwood-derived carbohydrate composition of claim 1, wherein the carbohydrate composition comprises one or more of monomeric arabinose, monomeric galactose, monomeric mannose, and monomeric fructose in an amount of 0.5-5 weight-% each, based on the total dry matter content of the carbohydrate composition.

8. The hardwood-derived carbohydrate composition of claim 1, wherein the carbohydrate composition comprises nitrogen in an amount of at most 0.3 weight-%, based on the total dry matter content of the carbohydrate composition when measured as total nitrogen content of the carbohydrate composition.

9. The hardwood-derived carbohydrate composition of claim 1, wherein the carbohydrate composition comprises monomeric C6 sugars in an amount of at most 15 weight-%, based on the total dry matter content of the carbohydrate composition.

10. The hardwood-derived carbohydrate composition of claim 1, wherein the conductivity of a 10% aqueous solution of the carbohydrate composition is 2.8-3.5 mS/cm, when determined according to SFS-EN 27888.

11. A method for producing the hardwood-derived carbohydrate composition of claim 1, wherein the method comprises:

- i) providing a wood-based feedstock originating from wood-based raw material and comprising wood chips, wherein the wood chips are hardwood chips,
- ii) subjecting the wood-based feedstock to a pretreatment to form a slurry, wherein the pretreatment comprises:
  - iia) subjecting the wood-based feedstock to an impregnation treatment with an impregnation liquid comprising sulfuric acid,
  - iib) subjecting the impregnated wood-based feedstock to steam explosion treatment to form steam-treated wood-based feedstock, wherein the amount of sulfuric acid in the steam explosion treatment is 0.10-0.75 weight % based on the total dry matter content of the wood-based feedstock, and
  - iic) mixing the steam-treated wood-based feedstock from iib) with a liquid to form the slurry; and
- iii) separating the slurry into a liquid fraction and a fraction comprising solid cellulose particles by a solid-liquid separation process to recover the liquid fraction as the hardwood-derived carbohydrate composition, wherein the weight ratio of monomeric glucose to monomeric xylose in the hardwood-derived carbohydrate composition is 0.1-0.2, and wherein the carbohydrate composition comprises soluble lignin in an amount of 5-15 weight % based on the total dry matter content of the carbohydrate composition.

12. The method of claim 11, wherein the impregnation treatment in iia) is carried out at a temperature of 80-100° C. for 1-30 minutes.

13. The hardwood-derived carbohydrate composition of claim 1, wherein the steam explosion treatment is carried out by treating the impregnated wood-based feedstock with steam having a temperature of 130-240° C., under a pressure of 0.17-3.25 MPaG followed by a sudden, explosive decompression of the wood-based feedstock.

14. The method of claim 11, wherein 87-95% of xylan present the impregnated wood-based feedstock is converted into xylose in iib).

15. The method of claim 11, wherein the pretreatment in ii) comprises, before subjecting to the impregnation treatment, subjecting the wood-based feedstock to pre-steaming to form pre-steamed wood-based feedstock.

16. The method of claim 11, wherein the solid-liquid separation process in iii) comprises washing.

17. The method of claim 11, wherein the separating the liquid fraction and the fraction comprising solid cellulose particles in iii) is carried out by displacement washing or countercurrent washing.

18. The hardwood-derived carbohydrate composition of claim 1, wherein monomeric sugars is in an amount of 50-80 weight-% based on the total dry matter content of the carbohydrate composition.

19. The hardwood-derived carbohydrate composition of claim 1, wherein the steam explosion treatment is followed by sudden explosive decompression.

20. The hardwood-derived carbohydrate composition of claim 1, wherein the amount of sulphuric acid in the steam explosion treatment is 0.10-0.75 weight-% based on the total dry matter content of the wood-based feedstock.

* * * * *